Figure 1:
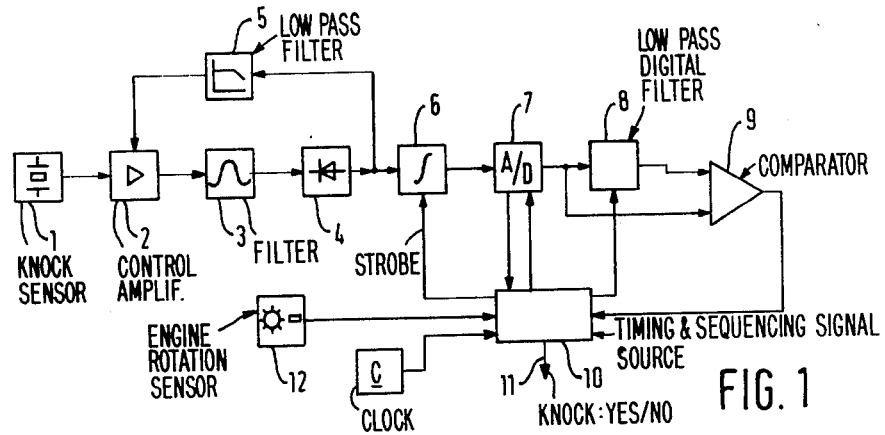

United States Patent [19]

Bonitz et al.

[11] Patent Number: 4,478,068
[45] Date of Patent: Oct. 23, 1984

[54] INTERNAL COMBUSTION ENGINE KNOCK SENSING METHOD AND SYSTEM

[75] Inventors: Jörg Bonitz, Mühlacker; Robert Entenmann, Benningen; Rochus Knab, Kornwestheim; Bernhard Miller, Stuttgart; Siegfried Rohde, Schwieberdingen; Herbert Schramm, Stuttgart; Walter Viess, Illingen, all of Fed. Rep. of Germany

[73] Assignee: Robert Bosch GmbH, Stuttgart, Fed. Rep. of Germany

[21] Appl. No.: 410,629

[22] Filed: Aug. 23, 1982

[30] Foreign Application Priority Data

Sep. 17, 1981 [DE] Fed. Rep. of Germany ....... 3137016

[51] Int. Cl.³ .............................................. G01L 23/22
[52] U.S. Cl. ...................................................... 73/35
[58] Field of Search ...................... 73/35; 123/425, 435

[56] References Cited

U.S. PATENT DOCUMENTS

| | | | |
|---|---|---|---|
| 3,540,262 | 11/1970 | Wostl et al. | 73/35 |
| 4,012,942 | 3/1977 | Harned | 73/35 |
| 4,111,035 | 9/1978 | West | 73/35 |
| 4,355,534 | 10/1982 | Roger | 73/35 |
| 4,387,588 | 6/1983 | Kaji | 73/35 |
| 4,388,902 | 6/1983 | Latapie | 73/35 X |

FOREIGN PATENT DOCUMENTS 2918420 2/1980 Fed. Rep. of Germany .
3001887 7/1981 Fed. Rep. of Germany .

*Primary Examiner*—James J. Gill
*Attorney, Agent, or Firm*—Frishauf, Holtz, Goodman & Woodward

[57] ABSTRACT

To recognize knocking conditions in signals derived from a knock sensor, which signals representative of knocking may be masked by background or noise signals, and to clearly distinguish the knocking signal from background or noise signals, the knocking signals are integrated with respect to measuring or strobing intervals during a predetermined angle of crankshaft rotation, digitized in an A/D converter (7) and then compared in a comparator (9) with the same signals which have been passed through a low-pass digital filter (8) to compare the integrated, digitized signal of a then occurring combustion process or event with similar signals of prior combustion processes or events to thereby recognize and distinguish knocking signal conditions from noise signal conditions; digital filtering and comparison as well as sequence timing can be carried out in a single microprocessor (FIGS. 2:14), earlier combustion events being weighted in accordance with the remoteness of their occurrence and/or engine speed and engine loading, the reference signal, for example, being generated in accordance with the formula:

$$y(t_i) = (1-k) \cdot y(t_{i-1}) + k x(t_i)$$

wherein
  $y(t_i)$ is the reference signal;
  i is the count index of the respective number of combustion cycles of the respective cylinder;
  $x(t_i)$ is the instantaneous digitized integrated value;
  and k is the weighting factor with which the then pertaining digitized integrated value is weighted to form the new reference value.

Combustion processes which resulted in knocking can be eliminated from forming part of the comparison.

17 Claims, 2 Drawing Figures

INTERNAL COMBUSTION ENGINE KNOCK SENSING METHOD AND SYSTEM

The present invention relates to internal combustion engines, and more particularly to a method and system to determine the nature of the combustion process in the cylinder of the engine, and especially to recognize whether the combustion proceeds under normal design conditions or results in engine knocking or pinging.

BACKGROUND

Under certain operating conditions, internal combustion (IC) engines are subject to knocking or pinging. These are audio frequency-type oscillations of the compressed fuel-air mixture, triggered by a pulse wave. Heat transfer to the inner walls of the cylinders and of the piston is excessive during such oscillations, and may lead to damage due to thermal overload. Thus, knocking is to be avoided if at all possible. Yet, operation of an IC engine just below the knocking limit provides for most efficient use of the engine with respect to fuel consumption and other operating parameters. Thus, it is desirable to operate the engine just below the knocking limit. This, however, requires that any knocking or tendency to knock is to be recognized promptly and reliably, so that the combustion conditions can be changed to prevent such knocking by controlling the engine to operate below the knocking conditions. Knocking or pinging can be prevented by, for example, slightly retarding the timing of ignition, for example by retarding the spark.

It is difficult to obtain signals which clearly identify combustion conditions resulting in knocking or a tendency to knock distinguished from normal combustion operation since vibrations and various conditions within the engine result in generation of noise signals, from which selection of actual knocking signals is difficult. It is, therefore, a substantial problem to select, reliably, a signal indicating knocking without regard to disturbances and noise, so that a clear "knocking yes/no" signal can be obtained.

U.S. Pat. No. 3,540,262 describes a knock sensor which furnishes a knocking signal which is compared with a threshold level, independent of the engine signals. Upon exceeding the threshold, a knock recognition signal is provided. In practice, it has been found that such an arrangement has a disadvantage in that the reference is unrelated to background noise levels occurring in signals provided by the sensor, and due to operation of the engine itself. Comparison is carried out only with respect to an external signal, independent of motor or engine operation or condition.

U.S. Pat. No. 4,012,942 describes a knock sensor in which the knocking signal which is furnished by a knock sensor is compared with a reference, which reference is generated by a function generator operating in dependence on engine speed. Actually occurring background noise signals of the engine are not considered in this comparison; rather, it is the intention to simulate noise signals by providing the function signals of the function generator. This system is not responsive to particular instantaneously occurring operation conditions of the engine, its adjustments and characteristics, as well changes in design operation due to aging, wear and tear, and the like.

It has previously been proposed—see German patent Disclosure Document DE-OS No. 29 18 420—to compare a knocking signal furnished by a sensor and which, simultaneously, includes background noise signals in a comparator to which the signal is directly applied and additionally applied via a low-pass filter. In this system, the knocking signal together with background noise is compared with the signal which was derived from the last few cycles of the engine. In accordance with this disclosure, the actual measurement is carried out during a strobing interval, that is, by providing a certain measuring window related to a predetermined angular position of the crankshaft of the engine, so that the time during which the knocking signal can be sensed is positively correlated to a predetermined angular range of the crankshaft.

THE INVENTION

It is an object to improve the reliability of recognition of knocking when sensing signals representative of combustion condition of the engine and to distinguish knocking conditions, as represented by the signals, from background noise signals, or other signals derived from the sensor and occuring during normal operating conditions of the IC engine.

Briefly, the knocking signal is compared in a comparator with a reference during a measuring or recognition or strobing interval, in which the reference signal is derived from the sensed engine combustion signal, but passed through a digital filter. Preferably, the sensed signal is integrated during an integration interval determined by the strobing or measuring interval, and the final integrated value converted into a digal value which is passed through a low-pass digital filter for comparison with the integrated value of the sensed signal.

In accordance with a feature of the invention, the reference signal generator includes an integrator connected to receive a demodulated signal representative of combustion, and further connected to a measuring or strobing interval forming device, to provide a measuring window. The integrator integrates the demodulated combustion representative signal during this measuring interval and derives an integrated signal which is converted in an analog/digital (A/D) converter to a digital signal to derive a digital value representative of the integrated signal at the termination of the measuring or strobing interval. A digital filter provides for digitally filtering the output of the integrated signal to generate a digital reference signal which is compared in a comparator with the digital combustion-representative signal.

The entire sensing steps can be sequenced by a sequencing circuit, which may take the form of a microprocessor; the microprocessor, additionally, can be programmed to carry out the steps of A/D conversion and digital filtering, as well as comparison to provide, at its output, an unambiguous "knocking yes/no" signal.

The system has the advantage that knocking recognition is obtained with improved reliability with respect to the background noise signal. Slowly arising and increasing noise levels, for example due to valve noises which occur even during the measuring interval, will not detrimentally affect recognition of knocking, since the reference signal will conform to such slow changes in amplitudes.

In accordance with a feature of the invention, the digitally determined integration value is blocked from affecting the formation of a reference signal if the output signal recognized knocking conditions, so that the reference signal level will not rise to an excessive level.

The reference signals which are derived are stored in memory, provided either in the microprocessor which controls the sequential sensing of the digital values, or in another external buffer memory, in accordance with well known digital storage technology, to modify the reference signal for a subsequent determination of knocking or non-knocking operating condition during a subsequent measuring window. In a multi-cylinder engine, which is the usual form of an automotive-type engine, the reference signals for respective cylinders can be individually stored so that knocking recognition and formation of the reference value for recognition can be individually associated with the individual sensors associated with individual cylinders.

DRAWINGS

Figure 2:
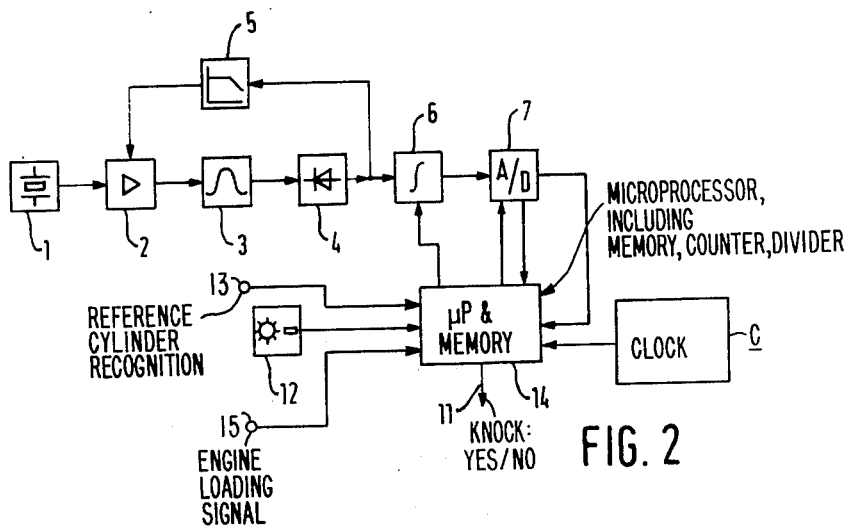

FIG. 1 is a schematic diagram of the system in accordance with the present invention and operating according to the method; and FIG. 2 is a schematic diagram of another embodiment.

A knock sensor 1 provides signals representative of the nature or characteristics of the combustion process in a cylinder of an IC engine during operation thereof. The signals from the knock sensor will be signals representative of combustion under knocking or non-knocking conditions; and if under knocking conditions, will have additional background or noise signals superimposed thereover. The signals from knock sensor 1 are connected over a control amplifier 2, the gain of which is controllable through a band-pass filter 3 to a demodulator 4. The output of the demodulator 4 is fed back through a low-pass filter 5 to control the amplification of the control amplifier 2. The output of the demodulator 4 is, additionally, connected to the integrator 6. The output of integrator 6 is connected to an analog/digital (A/D) converter 7.

The output of the A/D converter 7 is connected, first, to a digital filter 8 and, secondly, to one input of a digital comparator 9. The digital filter 8 is connected to the second or comparison input of the digital comparator 9. The integrator 6, the A/D converter 7, and the filter 8 are controlled for operation by a timing and sequencing signaling source 10. The signaling source 10 provides at its output terminal 11 a recognition signal: knocking yes/no. A clock source C provides clock signals to the timing and sequencing signal source. Additionally, a rotation transducer 12, coupled to rotate with the crankshaft of the IC engine, provides output signals representative of engine speed and angular position of the crankshaft angle of the engine.

Operation: Signals derived from the knock sensor 1 are amplified in the control amplifier 2 and filtered in filter 3. The filter 3 supplies those signals to the demodulator 4 which fall within a preferred frequency band. The signals which are preferred are those which are within a certain frequency band as determined by experience or design, and which are particularly related to knocking signals. The demodulator, receiving the signals from filter 3, may be merely a rectifier. The controllers for the control amplifier 2 which, in its simplest form, is essentially a low-pass filter, so controls the amplification of amplifier 2 that, if the signals derived from knock sensor 1 are low, the amplification is high; whereas, if the signals derived from sensor 1 are high, the amplification is reduced. By controlling the amplification factor, the output signal from the amplifier 2, or the demodulator 4, respectively, will be essentially level or constant, and independent of engine speed. Many knock sensors provide output signals in which the amplitude changes, by increasing with increasing engine speed.

The integrator 6 integrates the signal during a measuring window or strobing interval, which is determined in synchronism with angular rotation of the crankshaft of the IC engine. It integrates the signal derived from the demodulator 4, starting from a level of null or zero. The measuring or strobing interval is formed in dependence on the signals derived from the transducer 12, as supplied to the timing and sequencing signal source which suitably controls the integrator 6 to integrate only during a certain interval of angular rotation of the crankshaft of the IC engine, as determined by the signals derived from transducer 12.

At the termination of the strobing interval, the output signal of integrator 6 is supplied to the A/D converter 7 to provide a digital value. The sequencing circuit, via control lines, provides the command to transform the integrated value into a digital value, for example by providing a "convert" command shortly after termination of the strobing interval. As soon as the digitizing is finished, the timing and sequencing signal source will receive from the A/D converter a suitable "executed" signal.

The sensor 1 provides signals representative of engine combustion cycles for each one of sequential cycles. They are converted in the A/D converter into a numerical sequence which is applied to the input of the digital filter 8. The digital filter 8 is, preferably, a first-order filter having low-pass characteristics. The digital filter 8 provides an output sequence forming reference values which are compared in the digital comparator 9 with the digitized actual values derived from the A/D converter 7. The comparator 9 then will provide a signal representative of the comparison to the timing and sequencing signal source 10 for transmission to the output terminal 11 indicating whether the then pertaining signal from A/D converter 7 exceeds, or does not exceed, the reference as determined by the signal passed through the low-pass digital filter 8. The timing and sequencing signal source 10 is also coupled to the A/D converter 7 as shown.

Embodiment of FIG. 2: The function of the components 8, 9, 10 of FIG. 1 can be combined in a single electronic microprocessor unit 14, as shown in FIG. 2. Microprocessor 14, thus, can be programmed to operate in form of a digital filter—as well known—and, of course, can readily carry out a digital comparison step. Elements 1–7 and 12, as well as clock source C, are identical to those of FIG. 1. The A/D converter 7 provides a digitized sensed or measured value to the microprocessor 14. The microprocessor 14 contains, internally, a counter corresponding to the number of cylinders of the IC engine. A terminal 13, connected to microprocessor 14, provides an input representative of recognition that a predetermined reference cylinder is at, or approaching, the strobing or measuring window angle of the crankshaft of the IC engine. The counter within the microprocessor 14 counts, corresponding to the number of cylinders, and with reference to the reference cylinder as determined by input 13, to apply the digitized output signals from the A/D converter 7 to memory addresses individually associated with the respective cylinders. The reference signal which is newly determined for each measuring value derived by the knock sensor of the respective cylinder is obtained within the microprocessor, operating according to a digital filter, in accordance with the mathematical relationship:

$$y(t_i) = (1-k) \cdot y(t_{i-1}) + k x(t_i) \quad (1)$$

wherein $y(t_i)$ is the then calculated reference value, i is the count index of the ignition or combustion cycles of respective cylinder, $x(t_i)$ is the digitized measured value derived from the A/D converter 7, and k is a weighting factor, with which the actual measured value is weighted to form a new reference value.

The factor k is emperically derived. Suitably, it can be selected to be dependent on engine speed and/or engine loading. An engine loading signal is applied to microprocessor 14 via terminal 15. Signals representative of engine loading are available in most modern vehicular-type IC engines, for example derived from a transducer representative of accelerator position. The factor k is stored by determining the number of shifts of the actual measured value $x(t_i)$ in a register within the microprocessor 14. This factor can be modified by for example sequential division by 2, and thus, for example, k may have the values: 0.5; 0.25; 0.125 etc. The actual measured value $x(t_i)$ is compared in a comparator 14 with the appropriate reference value $y(t_i)$, and the comparison then determines whether the actual measured value is greater than the reference value by a predetermined difference or factor. If so, the combustion event is evaluated as knocking or pinging, which is indicated by a "yes" output from terminal 11. If the output from the sensor, however, is below the respective difference value, the sensor output is evaluated as noise, and terminal 11 will provide a "no" signal.

Recognition of combustion conditions within the unit 14 can be carried out with respect to the particular cylinders. The reference values stored in the respective memory addresses associated with respective cylinders are sequentially read out and, in dependence on the actual measured value, are newly computed. The knocking recognition signal 11 then can be used to control the ignition timing for each cylinder individually, so that knocking or pinging occurring only within a certain cylinder of a multi-cylinder IC engine can be eliminated. The reference value, as above described, can use the output signal $y(t_i)$; it is also possible, of course, to use a value of $y(t_{i-1})$ in which, then, the actual measured value is not retained within the output signal, but rather a preceding measured value. Additionally, and in accordance with a feature of the invention, if the sensed value $x(t_{i-1})$ has been recognized to be caused by a knocking combustion at a prior combustion event, in which $y(t_{i-1})$ was used for knocking recognition, the actual measured value $x(t_i)$ then is suppressed to form the new reference value $y(t_i)$. This can, simply, be so obtained that the factor k for the respective measuring value is then further reduced to zero, for example. This prevents excessive increase of the reference value if combustion under knocking condition should occur.

Various changes and modifications may be made, and features described in connection with any one of the embodiments may be used with any of the others, within the scope of the inventive concept.

We claim:

1. Method of recognizing the nature of the combustion process in operation of an internal combustion (IC) engine, including knocking operation, comprising the steps of generating a combustion-related signal;

deriving from the combustion-related signal a derived combustion related signal in digital form;

generating a reference signal in digital form;

comparing the combustion-related signal and the reference signal to obtain an output signal representative of the nature of the combustion process, and wherein the step of generating the reference signal includes digitally filtering the derived digital combustion signal by passing the combustion signal through a digital low pass filter;

the step of comparing the signals comprises comparing the digitally filtered combustion-related signal with the actual combustion-related signal;

and wherein the step of generating the reference signal includes the step of modifying the filtering function of the digital filter by a factor k, said factor k being a weighting factor which varies on an engine operating parameter comprising at least one of:

engine speed;

engine loading;

knocking, or non-knocking operation of the engine.

2. Method of recognizing the nature of the combustion process in operation of an internal combustion (IC) engine, including knocking operation, comprising the steps of generating a combustion-related signal;

deriving, from said combustion-related signal, a derived combustion-related signal in digital form;

generating a reference signal in digital form;

comparing the combustion-related signal and the reference signal to obtain an output signal representative of the nature of the combustion process, and wherein, in accordance with the invention, the step of generating the reference signal includes digitally filtering the derived, digital combustion-related signal by passing the combustion-related signal through a digital low-pass filter, and modifying the filtering function of the digital filter by a factor k;

storing the reference signal of at least one prior combustion cycle of the engine;

weighting said prior reference signal by the factor k, wherein the factor k is a weighting factor which varies in dependence on an engine operating parameter comprising at least one of: engine speed, engine loading; knocking or non-knocking operation of the engine;

and combining said weighted prior reference signal with the reference signal of the then pertaining combustion event to provide a modified reference signal for comparison with the actual combustion related signal.

3. Method according to claim 2, wherein the step of generating the combustion related signal comprises integrating the signal derived from a knock sensor during a predetermined strobing or measuring window interval;

deriving a digital value representative of the integrated combustion related signal and forming a digitized integrated value;

and wherein said combining step is carried out according to the relationship:

$$y(t_i)=(1-k).y(t_{i-1})+kx(t_i)$$

wherein y($t_i$) is the reference signal;

i is the count index of the respective number of combustion cycles of the respective cylinder;

x($t_i$) is the instantaneous digitized integrated value; and k is the weighting factor with which the then pertaining digitized integrated value is weighted to form the new reference value.

4. Method according to claim 3, wherein said factor k comprises 1/n, wherein n=2, 4, 8, 16 . . . .

5. Method according to claim 3, including the step of blocking the integrated digitized value from forming the reference signal if said comparison step indicated that the combustion characteristics or nature were in the knocking combustion mode.

6. Method according to claim 3, wherein the factor k defines the number of shifts of the digitized integrated value.

7. Method according to claim 6, including the step of storing the number of shifts of the digitized integrated value in a storage register or memory of predetermined memory capacity.

8. Method according to claim 2, including the step of blocking the digital stored signal of a prior combustion cycle from forming the reference signal if said comparison step indicated that the combustion characteristics or nature were in the knocking combustion mode.

9. Method according to claim 2, wherein the factor k defines the number of prior combustion cycles.

10. System to recognize the nature of the combustion process in the operation of an internal combustion engine including knocking operation, having means (1) for obtaining a signal representative of combustion condition in a cylinder of the engine;

a demodulator stage (4) demodulating the combustion representative signal and deriving a demodulated combustion signal;

means (6, 7, 8) for generating a reference signal;

comparator means (9, 14) for comparing the combustion representative signal with the reference signal;

and means (10, 12; 14, 12) for forming a measuring or strobing interval, connected to and controlling the comparator means to effect comparison of the combustion representative signal and the reference signal only during occurrence of the measuring or strobing interval, wherein the reference signal generating means comprises an integrator (6) connected to and receiving the demodulated combustion representative signal and providing an integrated signal;

said integrator being further connected to said measuring or strobing interval forming means for integrating the demodulated combustion representative signal during said measuring or strobing interval to derive an integrated signal;

an analog/digital (A/D) converter (7) digitizing the integrated signal and deriving a digital value representative of the integrated signal at the termination of the measuring or strobing interval;

a low-pass digital filter (8, 14) connected for digitally filtering the output of the integrator (6) to generate a digital reference signal, and providing its output in form of the digital reference signal to the comparator (9, 14), the comparator receiving, as reference comparison, the digitized value representative of the integrated signal from the A/D converter for comparison with the actual measuring signal;

and output means (10, 11) connected to and controlled by the comparator and providing an output signal representative of knocking: yes/no conditions of combustion in the internal combustion engine in dependence on the comparison effected by the comparator between the digitized, integrated value of the actual combustion signal and the digitally low-pass filtered reference signal;

wherein the means for digitally filtering the output of the integrator, said comparator means, and said means for forming a measuring or strobing interval, together, define a signal processing unit;

said signal processing unit further includes a memory, and sequencing means for sequentially applying to the comparator the digital reference signal and the digital value representative of the integrated signal at the termination of the measuring or strobing interval;

and wherein the digital processing unit modifies the filtering function of the digital filter by a factor k, said factor k being a weighting factor which varies on an engine operating parameter comprising at least one of:

engine speed;

engine loading;

knocking, or non-knocking operation of the engine.

11. System according to claim 10, wherein said digital signal processing unit generates the reference signal in accordance with the relationship:

$$y(t_i)=(1-k).y(t_{i-1})+kx(t_i)$$

wherein y($t_i$) is the reference signal;

i is the count index of the respective number of combustion cycles of the respective cylinder;

x($t_i$) is the instantaneous digitized integrated value; and k is the weighting factor with which the then pertaining digitized integrated value is weighted to form the new reference value.

12. System according to claim 11, wherein the reference signal is derived from the signal of a prior combustion process represented by y($t_{i-1}$) to exclude the respective signal values of the then occurring combustion process from the reference signal generated by the reference signal generating means.

13. System according to claim 11, including a register or counter within the digital signal processing unit (14), said register or counter determining the value of the factor k by counting the number of shifts of the digitized integrated value.

14. System according to claim 13, wherein the factor k is divided by two (2) for each shift of the digitized integrated value, representative of succeeding combustion processes, to assign a lesser weighting value to earlier occurring combustion processes.

15. System according to claim 10, wherein said factor k comprises 1/n, wherein n=2, 4, 8, 16 . . . .

16. System according to claim 10, for use with and combination in a multi-cylinder IC engine, including cylinder recognition means (13);

said memory (14) storing the reference signals of prior combustion processes in addresses related specifically to the respective cylinders of the IC engine in accordance with signals derived from the signal recognition means for associating the reference signals with respective individual cylinders.

17. System according to claim 10, wherein, if the comparator determines that the combustion process results in engine knocking, the value of said so determined combustion process is blocked from being applied to formation of the reference signal.

* * * * *

UNITED STATES PATENT AND TRADEMARK OFFICE
CERTIFICATE OF CORRECTION

PATENT NO. : 4,478,068
DATED : OCTOBER 23, 1984
INVENTOR(S) : Jorg BONITZ et al

It is certified that error appears in the above-identified patent and that said Letters Patent is hereby corrected as shown below:

Claim 15, column 8, line 60, change "claim 10" to -- claim 11 --

Signed and Sealed this

Twenty-eighth Day of January 1986

[SEAL]

Attest:

DONALD J. QUIGG

Attesting Officer   Commissioner of Patents and Trademarks